(12) United States Patent
Ouziel et al.

(10) Patent No.: US 8,093,375 B2
(45) Date of Patent: Jan. 10, 2012

(54) REACTIVE POLYSACCHARIDE DERIVATIVES, THEIR PREPARATION AND THEIR USE

(75) Inventors: Philippe Ouziel, Altkirch (FR); Torsten Kulke, North Ferriby (GB)

(73) Assignee: BASF SE Ludwigshafen (DE)

( * ) Notice: Subject to any disclaimer, the term of this patent is extended or adjusted under 35 U.S.C. 154(b) by 883 days.

(21) Appl. No.: 11/660,533

(22) PCT Filed: Aug. 10, 2005

(86) PCT No.: PCT/EP2005/053923
§ 371 (c)(1),
(2), (4) Date: Feb. 16, 2007

(87) PCT Pub. No.: WO2006/018412
PCT Pub. Date: Feb. 23, 2006

(65) Prior Publication Data
US 2007/0277328 A1 Dec. 6, 2007

(30) Foreign Application Priority Data
Aug. 20, 2004 (EP) .................................. 04103997

(51) Int. Cl.
*C08B 37/16* (2006.01)
(52) U.S. Cl. ........................................ 536/103
(58) Field of Classification Search .................. None
See application file for complete search history.

(56) References Cited

U.S. PATENT DOCUMENTS

| | | | | |
|---|---|---|---|---|
| 4,563,189 | A | * | 1/1986 | Lewis ................. 8/493 |
| 5,597,904 | A | * | 1/1997 | Tzikas et al. ............ 534/642 |
| 5,728,823 | A | | 3/1998 | Reuscher et al. ............ 536/46 |
| 7,105,500 | B2 | | 9/2006 | Mao et al. ................ 514/58 |
| 2005/0080254 | A1 | | 4/2005 | Schmidt et al. ............ 536/103 |
| 2005/0192435 | A1 | | 9/2005 | Kulke ............... 536/46 |

FOREIGN PATENT DOCUMENTS

| | | |
|---|---|---|
| DE | 40 35 378 | 5/1992 |
| DE | 195 20 967 | 12/1996 |
| DE | 101 55 781 | 5/2003 |
| WO | 02/22941 | 3/2002 |
| WO | 03/042449 | 5/2003 |
| WO | 03/093325 | 11/2003 |

OTHER PUBLICATIONS

Tang et al. Color. Technol., 120, Jul. 2004, pp. 180-183.*
English Language Abstract for DE 195 20 967 A1 (Dec. 12, 1996).
English Language Abstract for DE 40 35 378 A1 (May 14, 1992).

* cited by examiner

*Primary Examiner* — Layla Bland
(74) *Attorney, Agent, or Firm* — Shiela A. Loggins

(57) ABSTRACT

A reactive polysaccharide derivative of formula, $[Z_1-B-SO_2-CH_2-CH_2-O]_n-PS-[OH]_m$ (1), wherein 8 is a radical of formula (2a), (2b), (2c), (2d) or (2e), Z, is a reactive radical, and PS is a cyclodextrin, is useful as a finishing agent for textile fibers and for other applications.

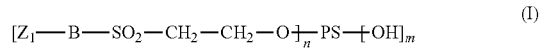

(I)

12 Claims, No Drawings

REACTIVE POLYSACCHARIDE DERIVATIVES, THEIR PREPARATION AND THEIR USE

The present invention relates to reactive polysaccharide derivatives, their preparation and their use.

Among the polysaccharide derivatives, which come into consideration for the present invention, cyclodextrins or cyclodextrin derivatives may be mentioned in particular.

Due to their particular properties cyclodextrins and cyclodextrin derivatives are used nowadays in numerous technical applications, for example, in the food, pharmaceutical, cosmetic or the chemical industry.

Cyclodextrins are cage like molecules of a cyclic configuration made up of a varying number of D-glucopyranosyl units, such as 6, 7 or 8 units ($\alpha$-, $\beta$- or $\gamma$-cyclodextrins), connected by alpha-(1,4)-glycosidic linkages, thereby defining a central cavity. The chemical formula of $\alpha$-cyclodextrin is depicted below.

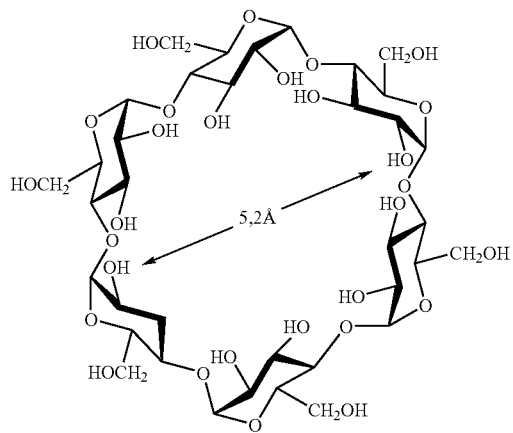

The natural cyclodextrins are produced from starch by the action of cyclodextrin glycosyltransferase (CGTase), an enzyme produced by several organisms, *Bacillus macerans* being the earliest source. The most stable three dimensional molecular configuration for these cyclic oligosaccharides takes the form of a toroid with the upper (larger) and lower (smaller) opening of the toroid presenting secondary and primary hydroxyl groups, respectively, to the solvent environment. The interior of the toroid is hydrophobic as a result of the electron rich environment provided in large part by the glycosidic oxygen atoms. It is the interplay of atomic (Van der Waals), thermodynamic (hydrogen bonding), and solvent (hydrophobic) forces that accounts for stable complexes that may be formed with chemical substances while in the apolar environment of the cyclodextrin cavity. The complex exists in an equilibrium dependent upon the concentrations of the cyclodextrin, the guest molecule and water. The rate at which the associated complex is formed is determined in large part by the accessibility of the guest molecule to the cyclodextrin cavity and the magnitude of the net thermodynamic driving force.

Beside the natural cyclodextrins numerous cyclodextrin derivatives are already known. These derivatives are obtained by conversion with compounds capable of reacting with the hydroxyl groups. Examples are the alkylated or hydroxyalkylated derivatives, such as the methylated, hydroxyethylated or hydroxypropylated cyclodextrins, which are accessible by reaction of cyclodextrin with an alkylating agent, such as dimethyl sulfate, ethylene oxide or propylene oxide. Reaction of cyclodextrin with carbonic acid anhydrides or carbonic acid halogenides, such as acetic acid anhydride, benzoyl chloride or naphthoyl chloride, yields the O-acylated derivatives. The respective carboxyl-modified derivatives are obtained, if cyclodextrin is reacted with dicarbonic acid anhydrides, such as malonic acid anhydride or succinic acid anhydride. Preparation of these derivatives is known and described in the corresponding prior art.

Due to the number of primary and secondary hydroxyl groups lining the lower and upper ridges of the toroid in the cyclodextrin molecule susceptible to such reactions highly complex mixtures of various isomeric forms of variously substituted cyclodextrin derivatives are obtained. There are, for example, $2^{21}-1$ or 2,097,151 possible geometric isomers for hydroxypropyl-$\beta$-cyclodextrin. The aggregate substitution that takes place is described by a term called the degree of substitution (DS), for example, a hydroxypropyl-$\beta$-cyclodextrin with a DS of about 0.72 would be composed of a distribution of isomers in which the average number of hydroxypropyl groups per hydroxypropyl-$\beta$-cyclodextrin molecule is five. Degree of substitution is usually determined by mass spectrometry (MS) or nuclear magnetic resonance (NMR) spectroscopy and does not give information as to the exact location of the substituents or the distribution of those substituents around the cyclodextrin molecule.

Furthermore, reactive cyclodextrin derivatives comprising at least one nitrogen-containing heterocycle having an electrophilic center are described, for example, in U.S. Pat. No. 5,728,823. Reactive cyclodextrin derivatives are able to react with the nucleophilic sites of different substrates and permanently modify the properties of these substrates. U.S. Pat. No. 5,728,823 teaches the preparation of cyclodextrins, wherein the reactive heterocycle, such as chlorotriazine, is attached to the cyclodextrin nucleus via an ether bond. These derivatives are prone to hydrolysis and, hence, their storage stability is insufficient, which is a disadvantage with regard to their application. Moreover, their reactivity is low.

A method for producing reactive cyclodextrins, wherein the reactive group is decoupled from the cyclodextrin nucleus by a flexible spacer, is described in the WO 03/042 449. In this case cyclodextrin is etherified with a bifunctional alkylen compound, such as a halogen-alkylen-amino compound. The terminal functions, e.g. amino groups, thus introduced into the cyclodextrin molecule serve as a nucleophilic site to bind the reactive group precursor.

Recently, reactive cyclodextrins have been applied also in the textile industry. Accordingly, uncomplexed cyclodextrin derivatives are used as finishing agents for the treatment of fiber materials in order to reduce or prevent malodors due to perspiration. The cyclodextrin molecules are attached to the fiber material and make sure that the effect stays permanent. Moreover, uncomplexed cyclodextrin derivatives allow for the complexation of fragrances and perfumes or antimicrobial substances which are released slowly and impart long-lasting fragrance or a prolonged antimicrobial effect to the finished textile material. Such applications are disclosed, for example, in German Patent No. 40 35 378 and in the WO 02/022 941. The prolonged presence of antimicrobials makes the substrates more hygienic, less prone to cross contamination and fresher.

Nowadays there is an increasing demand for improved reactive polysaccharide derivatives which are useful in various applications, for example, as finishing agents in the textile industry, and which do not show the disadvantage of the prior art systems. In particular they should be stable when stored for a prolonged period of time without hydrolyzation of the reactive moiety. Furthermore, it is desired, that the reactive polysaccharide derivatives are easy to manufacture and that their preparation can be carried out in an aqueous system without organic solvents being required. Moreover, the reactive polysaccharide derivatives should be distinguished by a good affinity, high reactivity and a good fixing ability.

Accordingly, it is the subject of the present invention to provide a reactive polysaccharide derivative, which corresponds to formula $$[Z_1—B—SO_2—CH_2—CH_2—O]_n PS-[OH]_m \quad (1),$$

wherein
B is a radical of formula

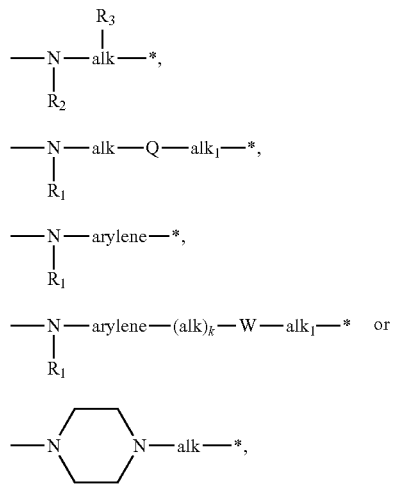

in which
$R_1$ is hydrogen or $C_1$-$C_4$alkyl,
$R_2$ is hydrogen, $C_1$-$C_4$alkyl unsubstituted or substituted by hydroxy, sulfo, sulfato, carboxy or by cyano, or a radical

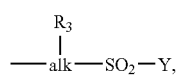

$R_3$ is hydrogen, hydroxy, sulfo, sulfato, carboxy, cyano, halogen, $C_1$-$C_4$alkoxycarbonyl, $C_1$-$C_4$alkanoyloxy, carbamoyl or a group —$SO_2$—Y,
alk and $alk_1$ are each independently of the other linear or branched $C_1$-$C_6$alkylene,
arylene is a phenylene or naphthylene radical unsubstituted or substituted by sulfo, carboxy, $C_1$-$C_4$alkyl, $C_1$-$C_4$alkoxy or by halogen,
Q is a radical —O— or —$NR_1$— wherein $R_1$ is defined as above,
W is a group —$SO_2$—$NR_2$—, —$CONR_2$— or —$NR_2CO$— wherein $R_2$ is as defined above,
Y is vinyl or a radical —$CH_2$—$CH_2$—U and U is a group removable under alkaline conditions, and
k is a number 0 or 1,
$Z_1$ is a reactive radical,
PS corresponds to the backbone of the polysaccharide molecule apart from the hydroxyl groups,
m is 0, 1 or an integer greater than 1,
n is 1 or an integer greater than 1, and
the sum of n+m corresponds to the original number of hydroxyl groups in the polysaccharide molecule, and wherein the asterisk in each of the radicals B of formulae (2a), (2b), (2c), (2d) and (2e) indicates the position which is bound to the sulfonyl group of the polysaccharide derivative of formula (1).

$R_1$ is preferably hydrogen, methyl or ethyl, and especially hydrogen.

$R_2$ is preferably hydrogen or $C_1$-$C_4$alkyl unsubstituted or substituted by hydroxy, sulfo, sulfato, carboxy or by cyano.

Especially $R_2$ is hydrogen or $C_1$-$C_4$alkyl, for example methyl, ethyl, propyl, isopropyl, butyl, isobutyl, sec-butyl and tert-butyl, and more especially hydrogen, methyl or ethyl. In a particular important embodiment $R_2$ is hydrogen.

$R_3$ is preferably hydrogen, hydroxy, sulfo, sulfato, carboxy, cyano, halogen, $C_1$-$C_4$alkoxycarbonyl, $C_1$-$C_4$alkanoyloxy or carbamoyl.

Especially $R_3$ is hydrogen.

alk and $alk_1$ are each independently of the other, for example, a $C_1$-$C_6$alkylene radical, such as a methylene, ethylene, 1,3-propylene, 1,4-butylene, 1,5-pentylene or 1,6-hexylene radical or a branched isomer thereof.

alk and $alk_1$ are preferably each independently of the other a $C_1$-$C_4$alkylene radical and especially an ethylene radical or propylene radical.

arylene is e.g. a phenylene or naphthylene radical each of which is unsubstituted or substituted, for example, by $C_1$-$C_4$alkyl, $C_1$-$C_4$alkoxy, halogen, sulfo or carboxy, preferably a 1,3- or 1,4-phenylene radical unsubstituted or substituted, for example, by sulfo, methyl, methoxy or by carboxy, and especially an unsubstituted 1,3- or 1,4-phenylene radical.

Q is preferably —NH— or —O— and especially —O—.

W is preferably a group of formula —CONH— or —NHCO—, especially a group of formula —CONH—.

As a group U removable under alkaline conditions there come into consideration, for example, —Cl, —Br, —F, —$OSO_3H$, —$SSO_3H$, —OCO—$CH_3$, —$OPO_3H_2$, —OCO—$C_6H_5$, —$OSO_2$—$C_1$-$C_4$alkyl and —$OSO_2$—N($C_1$-$C_4$alkyl)$_2$. U is preferably a group of formula —Cl, —$OSO_3H$, —$SSO_3H$, —OCO—$CH_3$, —OCO—$C_6H_5$ or —$OPO_3H_2$, especially —Cl or —$OSO_3H$ and more especially —$OSO_3H$.

Examples of suitable radicals Y are accordingly vinyl, β-bromo- or β-chloro-ethyl, β-acetoxy-ethyl, β-benzoyloxy-ethyl, β-phosphatoethyl, β-sulfatoethyl and β-thiosulfatoethyl. Y is preferably vinyl, β-chloroethyl or β-sulfatoethyl, and especially vinyl or β-sulfatoethyl.

If $R_2$ in the radical B of formula (2a) corresponds to a group

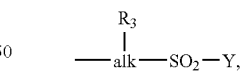

Y may also be an ethylene group, wherein one of the carbon atoms is bound to an oxygen atom of the polysaccharide derivative of formula (1).

If $R_3$ in the radical B of formula (2a) corresponds to a group —$SO_2$—Y, Y may also be an ethylene group, wherein one of the carbon atoms is bound to an oxygen atom of the polysaccharide derivative of formula (1).

k is preferably the number 0.

The radicals B of formulae (2a) to (2e) are preferably those wherein W is a group of formula —CONH— or —NHCO—, $R_1$ is hydrogen, methyl or ethyl, $R_2$ and $R_3$ are each hydrogen, Q is a radical —O— or —NH—, alk and $alk_1$ are each independently of the other ethylene or propylene, arylene is phenylene unsubstituted or substituted by methyl, methoxy, carboxy or by sulfo, and k is the number 0.

Especially B is a radical of formula

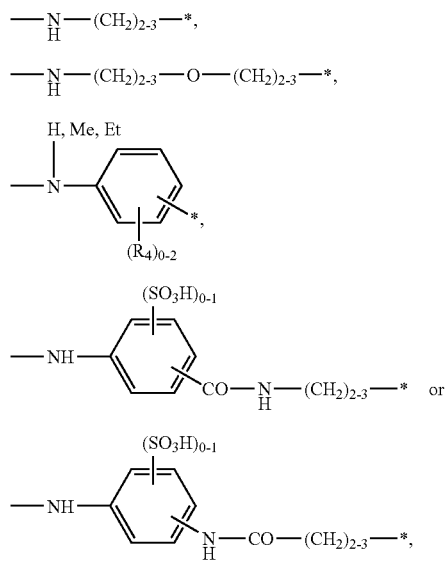

more especially of formula (2c'), (2d') or (2d"), in which $(R_4)_{0-2}$ is 0 to 2 identical or different substituents from the group of methyl, methoxy and sulfo, and the asterisk in each of the radicals B of formulae (2a'), (2b'), (2c'), (2d') and (2d") indicates the position which is bound to the sulfonyl group of the polysaccharide derivative of formula (1).

In the radical of formula (2c') Me is methyl and Et is ethyl. Beside hydrogen, the said radicals come into consideration as the substituent attached to the nitrogen atom.

The radical of formula (2c') is preferably a radical of formula

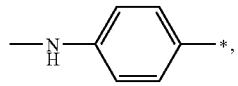

(2c")

wherein
the asterisk indicates the position which is bound to the sulfonyl group of the polysaccharide derivative of formula (1).

In an important embodiment the radical B corresponds to a radical of formula (2c'), especially (2c"), in which $(R_4)_{0-2}$ is as defined above.

The reactive radical $Z_1$ is to be understood as being a radical which is capable of reacting with functional groups of a suitable reactant or a suitable substrate, such as a natural or man-made polymer or a textile fiber material, for example, with the hydroxyl groups of cellulose, with the amino, carboxy, hydroxy and thiol groups in wool, silk and other keratinous fibers or with the amino and possibly carboxy groups of synthetic polyamides to form covalent chemical bonds. Suitable reactive radicals are, for example, those having at least one removable atom or group at an aliphatic, aromatic or preferably a heterocyclic radical or those wherein the mentioned radicals contain a radical suitable for reaction with the reactant or substrate, for example a vinyl radical.

Removable atoms and removable groups or leaving groups are, for example, halogen, such as fluorine, chlorine or bromine, ammonium, including hydrazinium, sulfato, thiosulfato, phosphato, acetoxy, propionyloxy, azido, carboxypyridinium or rhodanido.

The reactive radical $Z_1$ is, for example, a radical of the vinylsulfonyl series, the acryloyl series or the heterocyclic series.

A reactive radical $Z_1$ from the group of the vinylsulfonyl series comprises, for example, alkyl-sulfonyl radicals substituted by a removable atom or by a removable group or alkenylsulfonyl radicals which are unsubstituted or substituted by a removable atom or by a removable group. The said alkylsulfonyl and alkenylsulfonyl radicals contain generally from 2 to 8, preferably from 2 to 4, and especially 2, carbon atoms.

A reactive radical $Z_1$ from the group of the acryloyl series comprises, for example, alkanoyl radicals substituted by a removable atom or by a removable group or alkenoyl radicals which are unsubstituted or substituted by a removable atom or by a removable group. The said alkanoyl and alkenoyl radicals contain generally from 2 to 8, preferably 3 or 4, and especially 3, carbon atoms.

Examples of a suitable reactive radical $Z_1$ from the group of the heterocyclic series comprises heterocyclic radicals that contain 4-, 5- or 6-membered rings and that are substituted by a removable atom or by a removable group. Suitable heterocyclic radicals are, for example, those that contain at least one removable substituent bonded to a heterocyclic radical, inter alia those that contain at least one reactive substituent bonded to a 5- or 6-membered heterocyclic ring, for example to a monoazine, diazine, pyridine, pyrimidine, pyridazine, pyrazine, thiazine, oxazine or asymmetrical or symmetrical triazine ring, or to such a ring system that has one or more fused-on aromatic rings, for example a quinoline, phthalazine, quinazoline, quinoxaline, acridine, phenazine or phenanthridine ring system.

A radical $Z_1$ from the group of the vinylsulfonyl series comprises, for example, a radical $-SO_2-CH=CH_2$ or $SO_2-CH_2-CH_2-U$ wherein U is a leaving group.

A radical $Z_1$ from the group of the acryloyl series comprises, for example, a radical $-CO-CH(Hal)-CH_2(Hal)$ or $-CO-C(Hal)=CH_2$ wherein Hal is chlorine or bromine.

A radical $Z_1$ from the group of the heterocyclic series comprises, for example, a halotriazine, halopyrimidine or haloquinoxaline radical, especially a halotriazine radical, wherein the halogen is fluorine or chlorine.

The reactive radical $Z_1$ and the radical B may be connected to one another by way of a bridging member. Suitable bridging members include, besides a direct bond, a very wide variety of radicals. For example, the bridging member is an aliphatic or aromatic radical; the bridging member may also be composed of various such radicals. A suitable aliphatic radical is, for example, an alkylene radical having from 1 to 6 carbon atoms, or a branched isomer thereof. The carbon chain of the alkylene radical may be interrupted by a hetero atom, for example an oxygen atom. A suitable aromatic radical is, for example, a phenyl radical which may be substituted, for example, by $C_1$-$C_4$alkyl, such as methyl or ethyl, $C_1$-$C_4$alkoxy, such as methoxy or ethoxy, halogen, such as fluorine, bromine or, especially, chlorine, carboxy or by sulfo. The bridging member may contain at least one functional group, for example the carbonyl- or the sulfonyl group.

Such reactive radicals $Z_1$ are known per se and large numbers of them are described in the art of reactive dyestuffs, for example, in Venkataraman "The Chemistry of Synthetic Dyes" Volume 6, pages 1-209, Academic Press, New York, London 1972, EP-A-625 549 and U.S. Pat. No. 5,684,138.

Preferably a reactive radical $Z_1$ corresponds to formula

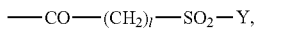 (3a)

 (3b)

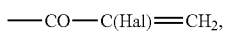 (3c)

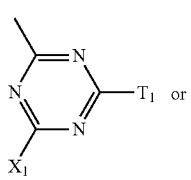 (3d)

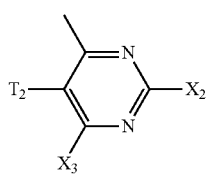 (3e)

in which
Hal is chlorine or bromine,
$X_1$ is halogen, pyridinium, 3-carboxypyridin-1-yl or 3-carbamoylpyridin-1-yl, or a reactive radical of formula

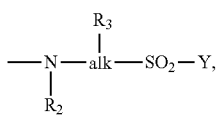 (4a)

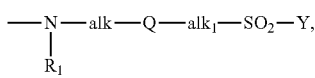 (4b)

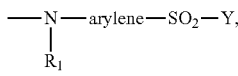 (4c)

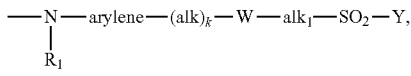 (4d)

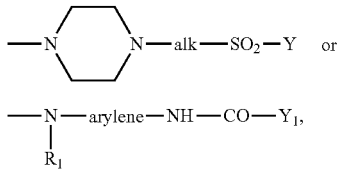 (4e)

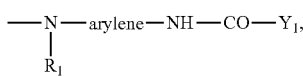 (4f)

in which
$R_1$ is hydrogen or $C_1$-$C_4$alkyl,
$R_2$ is hydrogen, $C_1$-$C_4$alkyl unsubstituted or substituted by hydroxy, sulfo, sulfato, carboxy or by cyano, or a radical

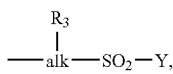

$R_3$ is hydrogen, hydroxy, sulfo, sulfato, carboxy, cyano, halogen, $C_1$-$C_4$alkoxycarbonyl, $C_1$-$C_4$alkanoyloxy, carbamoyl or a group —$SO_2$—Y, alk and $alk_1$ are each independently of the other linear or branched $C_1$-$C_6$alkylene,
arylene is a phenylene or naphthylene radical unsubstituted or substituted by sulfo, carboxy, $C_1$-$C_4$alkyl, $C_1$-$C_4$alkoxy or by halogen,
Q is a radical —O— or —$NR_1$— wherein $R_1$ is defined as above,
W is a group —$SO_2$—$NR_2$—, —$CONR_2$— or —$NR_2CO$— wherein $R_2$ is defined as above,
Y is vinyl or a radical —$CH_2$—$CH_2$—U and U is a group removable under alkaline conditions,
$Y_1$ is a group —CH(Hal)-$CH_2$-Hal or —C(Hal)=$CH_2$ and Hal is chlorine or bromine, and
l is an integer from 1 to 6 and k is a number 0 or 1, and
$X_2$ is halogen or $C_1$-$C_4$alkylsulfonyl,
$X_3$ is halogen or $C_1$-$C_4$alkyl,
$T_1$ has independently the same definitions as $X_1$ above, or is a non-reactive substituent, and
$T_2$ is hydrogen, cyano or halogen, wherein
preferences for $R_1$, $R_2$, $R_3$, alk, $alk_1$, arylene, Q, W, Y and k are as indicated above.

Hal is preferably bromine.
$X_1$ is preferably halogen, such as fluorine, chlorine or bromine, especially chlorine or fluorine and in particular chlorine.
l is preferably a number 2, 3 or 4, and especially a number 2 or 3.
More especially, l is the number 3.
$T_2$, $X_2$ and $X_3$ as halogen are, for example, fluorine, chlorine or bromine, especially chlorine or fluorine.
$X_2$ as $C_1$-$C_4$alkylsulfonyl is, for example, ethylsulfonyl or methylsulfonyl and especially methylsulfonyl.
$X_3$ as $C_1$-$C_4$alkyl is, for example, methyl, ethyl, n- or isopropyl, n-, iso- or tert-butyl and especially methyl.
$X_2$ and $X_3$ are preferably each independently of the other chlorine or fluorine.
$T_2$ is preferably cyano or chlorine.
For a non-reactive substituent $T_1$ there come into consideration, for example, the following radicals:
hydroxy;
$C_1$-$C_4$alkoxy, e.g. methoxy, ethoxy, n- or iso-propoxy, n-, sec-, iso- or tert-butoxy, especially methoxy or ethoxy; the mentioned radicals are unsubstituted or substituted in the alkyl moiety, for example, by $C_1$-$C_4$alkoxy, hydroxy, sulfo or by carboxy;
$C_1$-$C_4$alkylthio, e.g. methylthio, ethylthio, n- or iso-propylthio or n-butylthio; the mentioned radicals are unsubstituted or substituted in the alkyl moiety, for example, by $C_1$-$C_4$alkoxy, hydroxy, sulfo or by carboxy;
amino;
N-mono- or N,N-di-$C_1$-$C_6$alkylamino, preferably N-mono- or N,N-di-$C_1$-$C_4$alkylamino; the mentioned radicals are unsubstituted or substituted in the alkyl moiety, e.g. by $C_2$-$C_4$-alkanoylamino, $C_1$-$C_4$alkoxy, hydroxy, sulfo, sulfato, carboxy, cyano, carbamoyl or by sulfamoyl and uninterrupted or interrupted in the alkyl moiety by oxygen; examples that may be mentioned include N-methylamino, N-ethylamino, N-propylamino, N,N-dimethylamino and N,N-diethylamino, N-β-hydroxyethylamino, N,N-di-β-hydroxyethylamino, N-2-(β-hydroxy-ethoxy)ethylamino, N-2-[2-(β-hydroxyethoxy)ethoxy]ethylamino, N-β-sulfatoethylamino, N-β-sulfoethylamino, N-carboxymethylamino, N-β-carboxy-ethylamino, N-α,β-dicarboxy-ethyl-amino, N-α,γ-dicarboxypropylamino and N-ethyl-N-β-hydroxyethylamino or N-methyl-N-β-hydroxyethylamino;
$C_5$-$C_7$cycloalkylamino, for example, cyclohexylamino, which includes both the unsubstituted radicals and the radicals substituted in the cycloalkyl ring, e.g. by $C_1$-$C_4$alkyl, especially methyl, or by carboxyl;

phenylamino or N—$C_1$-$C_4$alkyl-N-phenylamino, which includes both the unsubstituted radicals and the radicals substituted in the phenyl ring, e.g. by $C_1$-$C_4$alkyl, $C_1$-$C_4$alkoxy, $C_2$-$C_4$-alkanoylamino, carboxy, carbamoyl, sulfo or by halogen, such as 2-, 3- or 4-chloro-phenylamino, 2-, 3- or 4-methylphenylamino, 2-, 3- or 4-methoxyphenylamino, 2-, 3- or 4-sulfophenylamino, disulfophenylamino or 2-, 3- or 4-carboxyphenyl-amino; naphthylamino unsubstituted or substituted in the naphthyl ring, e.g. by sulfo, preferably the radicals substituted by from 1 to 3 sulfo groups, such as 1- or 2-naphthylamino, 1-sulfo-2-naphthylamino, 1,5-disulfo-2-naphthylamino or 4,8-disulfo-2-naphthylamino;

benzylamino unsubstituted or substituted in the phenyl moiety, e.g. by $C_1$-$C_4$alkyl, $C_1$-$C_4$-alkoxy, carboxy, sulfo or by halogen; or piperidino or morpholino.

As a non-reactive radical, $T_1$ is preferably $C_1$-$C_4$alkoxy, $C_1$-$C_4$alkylthio, hydroxy, amino, N-mono- or N,N-di-$C_1$-$C_4$alkylamino unsubstituted or substituted in the alkyl moiety by hydroxy, sulfato or by sulfo, morpholino, or phenylamino or N—$C_1$-$C_4$alkyl-N-phenylamino (wherein the alkyl is unsubstituted or substituted by hydroxy, sulfo or by sulfato) each unsubstituted or substituted in the phenyl ring by sulfo, carboxy, acetylamino, chlorine, methyl or by methoxy, or naphthylamino unsubstituted or substituted by from 1 to 3 sulfo groups.

Especially preferred non-reactive radicals $T_1$ are amino, N-methylamino, N-ethylamino, N-β-hydroxyethylamino, N-methyl-N-β-hydroxyethylamino, N-ethyl-N-β-hydroxyethylamino, N,N-di-β-hydroxyethylamino, morpholino, 2-, 3- or 4-carboxyphenylamino, 2-, 3- or 4-sulfo-phenylamino or N—$C_1$-$C_4$alkyl-N-phenylamino.

The reactive radicals of formulae (4a) to (4f) are preferably those wherein W is a group of formula —CONH— or —NHCO—, $R_1$ is hydrogen, methyl or ethyl, $R_2$ and $R_3$ are each hydrogen, Q is a radical —O— or —NH—, alk and $alk_1$ are each independently of the other ethylene or propylene, arylene is phenylene unsubstituted or substituted by methyl, methoxy, carboxy or by sulfo, Y is vinyl, β-chloroethyl or β-sulfatoethyl, $Y_1$ is —CHBr—$CH_2$Br or —CBr=$CH_2$ and k is the number 0.

More preferably $Z_1$ is a radical of formula (3a), (3b), (3c) or (3d) as defined above, in which Y is vinyl, β-chloroethyl or β-sulfatoethyl, Hal is bromine, I is a number 2 or 3, $X_1$ is halogen, $T_1$ is $C_1$-$C_4$alkoxy, $C_1$-$C_4$alkylthio, hydroxy, amino, N-mono- or N,N-di-$C_1$-$C_4$alkylamino unsubstituted or substituted in the alkyl moiety by hydroxy, sulfato or by sulfo, morpholino, or phenylamino or N—$C_1$-$C_4$alkyl-N-phenylamino each unsubstituted or substituted in the phenyl ring by sulfo, carboxy, acetylamino, chlorine, methyl or by methoxy and wherein the alkyl is unsubstituted or substituted by hydroxy, sulfo or by sulfato, or naphthylamino unsubstituted or substituted by from 1 to 3 sulfo groups, or is a fibre-reactive radical of formula

  (4a')

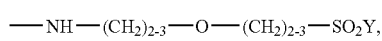  (4b')

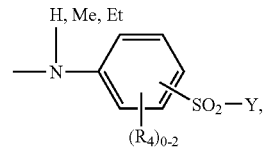  (4c')

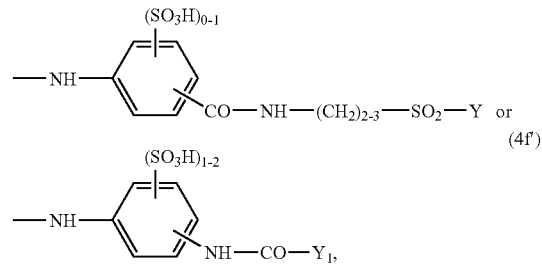  (4d')
(4f')

especially (4c') or (4d') and in particular (4c'), in which $(R_4)_{0-2}$ is 0 to 2 identical or different substituents from the group of methyl, methoxy and sulfo, especially methyl and methoxy, Y is as defined above, and $Y_1$ is a group —CH(Br)—$CH_2$—Br or —C(Br)=$CH_2$.

In the radical of formula (4c') Me is methyl and Et is ethyl. Beside hydrogen, the said radicals come into consideration as the substituent attached to the nitrogen atom.

The radical of formula (4c') is preferably a radical of formula

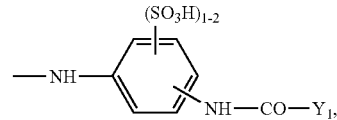  (4c")

wherein

Y has the meanings and preferred meanings given above.

In an important embodiment the reactive radical $Z_1$ corresponds to a radical of formula (3a) or (3d), especially (3d), in which $X_1$, $T_1$, Y and I are as defined and preferred above.

Preferred are polysaccharide derivatives of the formula (1), wherein

B is a radical of formula (2c'), (2d') or (2d"), especially (2c'), as defined above, in which $(R_4)_{0-2}$ is 0 to 2 identical or different substituents from the group of methyl, methoxy and sulfo, $Z_1$ is a radical of formula (3a), (3b), (3c) or (3d), especially (3a) or (3d) and in particular (3d), as defined above, in which Y is vinyl, β-chloroethyl or β-sulfatoethyl, Hal is bromine, I is a number 2 or 3, $X_1$ is halogen, $T_1$ is $C_1$-$C_4$alkoxy, $C_1$-$C_4$alkylthio, hydroxy, amino, N-mono- or N,N-di-$C_1$-$C_4$alkylamino unsubstituted or substituted in the alkyl moiety by hydroxy, sulfato or by sulfo, morpholino, or phenylamino or N—$C_1$-$C_4$alkyl-N-phenylamino each unsubstituted or substituted in the phenyl ring by sulfo, carboxy, acetylamino, chlorine, methyl or by methoxy and wherein the alkyl is unsubstituted or substituted by hydroxy, sulfo or by sulfato, or naphthylamino unsubstituted or substituted by from 1 to 3 sulfo groups, or is a fibre-reactive radical of formula (4a'), (4b'), (4c'), (4d') or (4f') as defined above, especially (4c') or (4d') and in particular (4c'), in which $(R_4)_{0-2}$ and Y are as defined above, and $Y_1$ is a group —CH(Br)—$CH_2$—Br or —C(Br)=$CH_2$, PS corresponds to the backbone of a cyclodextrin or a cyclodextrin derivative apart from the hydroxyl groups, m is 0, 1 or an integer greater than 1, n is 1 or an integer greater than 1, and the sum of n+m corresponds to the original number of hydroxyl groups in the reactive cyclodextrin or cyclodextrin derivative of formula (1), i.e. the total number of hydroxyl groups in the cyclodextrin or cyclodextrin derivative of formula (5).

Sulfo groups present in the reactive polysaccharide derivative of formulae (1) are each either in the form of their free acid or preferably in the form of a salt thereof. Salts that come into consideration include, for example, the alkali metal, alkaline earth metal or ammonium salts, salts of an organic amine or mixtures thereof. Examples that may be mentioned are sodium, lithium, potassium and ammonium salts, the salt of mono-, di- or tri-ethanolamine or Na/Li or Na/Li/$NH_4$ mixed salts.

The present invention relates also to a process for the preparation of the reactive polysaccharide derivative of formula (1), which process comprises the steps of (i) reacting the polysaccharide compound of formula

$$PS\text{-}[OH]_{n+m} \qquad (5)$$

with at least n molar equivalents of the compound of the formula

$$H\text{—}B\text{—}SO_2\text{—}Y \qquad (6)$$

to yield the compound of formula

$$[H\text{—}B\text{—}SO_2\text{—}CH_2\text{—}CH_2\text{—}O\text{]}_n\text{PS-}[OH]_m \qquad (7),$$

and allowing the compound of the formula (7) to react with at least n molar equivalents of the compound of the formula

$$Z_1\text{—}X \qquad (8), or$$

(ii) reacting the polysaccharide compound of formula (5) with at least n molar equivalents of the compound of the formula

$$Z_1\text{—}B\text{—}SO_2\text{—}Y \qquad (9),$$

wherein

Y, B, $Z_1$, m and n are as defined and preferred above, and X is a leaving group, and PS is as defined hereinafter.

The sum of n+m corresponds to the original number of hydroxyl groups in the reactive polysaccharide derivative of formula (1), i.e. the total number of hydroxyl groups in the polysaccharide compound of formula (5), which is, for example, 18 for α-cyclodextrin, 21 for β-cyclodextrin and 24 for γ-cyclodextrin. n corresponds to the number of the radicals of the formula $Z_1$—B—$SO_2$—$CH_2$—$CH_2$—O— in the polysaccharide derivative of the formula (1). n is at least 1 and does not correspond to the average number of the radicals of the formula $Z_1$—B—$SO_2$—$CH_2$—$CH_2$—O— in the polysaccharide derivative of the formula (1), i.e. the average degree of substitution (DS), which refers to a population of polysaccharide derivatives. The average degree of substitution (DS) can also be a noninteger, for example, a number smaller than 1, such as 0.3.

The upper limit of n is determined by the total number n+m of hydroxyl groups in the polysaccharide compound of formula (5) available for the substitution reaction according to the preparation process given above. Theoretically, the upper limit of n is 18 for α-cyclodextrin, 21 for β-cyclodextrin, and 24 for γ-cyclodextrin. In this case m is 0.

DS is e.g. 0.14 to 34, especially 0.14 to 1 and in particular 0.14 to 0.5.

The radical of formula $Z_1$—B—$SO_2$—$CH_2$—$CH_2$—O— is attached to the carbon atom in the 2, 3 or 6-position, preferably in the 6-position, of the D-glucopyranosyl unit of the polysaccharide compound.

Preferably the polysaccharide derivative of formula (1) is prepared by reacting the compound of formula (5) with at least n molar equivalents of the compound of the formula (6) to yield the compound of formula (7), and allowing the compound of the formula (7) to react with at least n molar equivalents of the compound of the formula (8).

The compound of the formula (9) can be prepared by allowing approximately one molar equivalent of a compound of formula (6) to react with approximately one molar equivalent of a compound of formula (8) in a condensation reaction known per se.

X is for example, halogen, such as fluorine, chlorine or bromine, preferably chlorine, Beside halogen, there also come into consideration for the leaving group X acyloxy radicals, such as acetyloxy or chloro acetyloxy.

Halogen is preferred for X.

Usually, the polysaccharide derivatives of formula (1) and their precursor of formula (7) are mixtures of isomers.

The compounds of the formulae (5), (6) and (8) are known or can be obtained in a manner known per se. Compounds of formula (6) and (8) are described, for example, in the prior art pertaining to reactive dyestuffs.

PS corresponds to the backbone or skeleton of the polysaccharide compound of formula (5) apart from the hydroxyl groups.

There come into consideration as the polysaccharide compound of formula (5) dextrin, cyclodextrin, alginic acid, alginic acid esters, chitin, chitosan, pectin, dextran and biopolymers containing oligosaccharide moieties, such as glycopeptides, preferably dextrin and cyclodextrin and especially cyclodextrin. In the context of the present invention the polysaccharide compound of formula (5) preferably corresponds to an oligosaccharide, i.e. compounds of a moderate molecular weight, which are water soluble, having in average e.g. up to 20 recurring units in the molecule.

The polysaccharide compound of formula (5) in the meaning of cyclodextrin comprises cyclodextrin and cyclodextrin derivatives which have at least one free OH group in the cyclodextrin molecule in at least one of the 2, 3 or 6-position of the D-glucopyranosyl ring. There comes into consideration as the compound of formula (5) α-, β-, γ- or δ-cyclodextrin or higher cyclodextrins or a mixture thereof as well as the corresponding derivatives.

Examples of cyclodextrin derivatives suitable for the preparation process according to the present invention are cyclodextrin ethers or mixed ethers, cyclodextrin esters or mixed esters or mixed cyclodextrin/ether/ester derivatives, in particular said derivatives of β-cyclodextrin.

Hydrophilic cyclodextrin derivatives having the following substituents are suitable: a $C_1$-$C_4$alkyl radical, such as methyl or ethyl, preferably methyl; a $C_2$-$C_6$hydroxyalkyl radical, such as 2-hydroxyethyl, 2- or 3-hydroxypropyl or hydroxybutyl, preferably 2- or 3-hydroxypropyl, a $C_3$-$C_6$oligohydroxyalkyl radical, preferably a $C_3$-$C_4$oligohydroxyalkyl radical, particularly preferably a dihydroxypropyl radical, such as 2,3-dihydroxypropyl, an acetyl radical, a propionyl radical, a butyryl radical, preferably an acetyl radical, or a propionyl radical, particularly preferably an acetyl radical. Hydrophilic cyclodextrin derivatives having an average degree of substitution per anhydroglucose (DS) of, for example, 0.3-2.0, preferably of 0.6-1.8, come into consideration.

Ionic cyclodextrin derivatives having the following substituents are also suitable: a $C_1$-$C_4$carboxyalkyl radical, such as carboxymethyl or 2-carboxyethyl, in the form of the free acid or as an alkali metal salt, a $C_1$-$C_4$alkyl radical substituted by sulfo, such as 2-sulfoethyl, in the form of the free acid or as an alkali metal salt, a $C_2$-$C_4$carboxyhydroxyalkyl radical in the form of the free acid or as an alkali metal salt, a $C_2$-$C_4$hydroxyalkyl radical substituted by sulfo in the form of the free acid or as an alkali metal salt. The average degree of substitution per anhydroglucose (DS) in these cyclodextrin derivatives is, for example, 0.3-2.0, preferably 0.4-1.5, especially 0.4-0.6.

Ionic cyclodextrin derivatives having an oxalyl radical, malonyl radical, succinyl radical, glutaryl radical and/or adipyl radical as substituents are also suitable, having an average degree of substitution per anhydroglucose (DS) of, for example, 0.3 to 2.0, preferably 0.4-1.5, especially 0.4-0.8.

In a particular embodiment of the present invention the compound of formula (5) corresponds to α-, β- or γ-cyclodextrin or a mixture of α-, β- and γ-cyclodextrin, especially to β-cyclodextrin.

The compounds of formula (7) are new. Accordingly, the present invention relates also to a compound of formula (7), wherein PS, B, m and n are as defined and preferred above.

The reactive polysaccharide derivatives according to the present invention are able to react with various compounds or substrates which contain nucleophilic groups capable to form a covalent bond upon reaction with the reactive radical Z, such as OH, NH or SH groups. Compounds which come into consideration are low molecular weight compounds, for example, alcohols, thiols or amines, or high molecular weight compounds, such as natural or synthetic polymers or a mixture of various polymer types, for example, starches, celluloses, glycogens, mannans, pectins, chitins, chitosans, alginic acid, albumins, collagen, elastin, globulins, fibrinogens, keratins, lignins, polyesters, polyamides, polyamines, phenolics, aminoplastics, polyurethanes, polyacrylic acids, polyacrylamides, polyallyl alcohols, polyallylamines, polyvinyl acetate polymers, polyvinyl alcohols, polyepoxides, cellulose-acrylates, starch-acrylates, biopolymers containing polysaccharide moieties, such as glycopeptides or starch protein and the like. Substrates which come into consideration comprise, for example, the polymers mentioned above which are substantially insoluble in water. They are, for example, in the form of pellets, beads, sheets or fibers. Examples are polymer beads, paper, textile fiber materials, keratinic fibers, such as human hair or leather. As possible substrates there come into consideration also self-assembled monolayers (SAMs) on silver or gold substrates bearing e.g. terminal hydroxyl, thiol or amino groups. SAMs are described, for example, in Science 1991, 254 (5036), 1312-1319; Journal of Physical Chemistry B, 1998, 102(2), 426-436; or WO-A-98/58 967. Modification of said substrates with the reactive polysaccharide derivatives of formula (1) affects, in particular, the surface or surface near regions.

Accordingly, the present invention relates also to a process for the preparation of compounds or substrates modified with polysaccharide, comprising reacting the said compounds or substrates with a polysaccharide derivative of formula (1), wherein PS, B, $Z_1$, m and n are as defined and preferred above.

The modification of high molecular weight compounds and the surface modification of substrates may be carried out, for example, in accordance with the methods described in U.S. Pat. No. 5,728,823.

The modified compounds or substrates thus obtained can be employed in numerous applications, such as given in U.S. Pat. No. 5,728,823.

The reactive polysaccharide derivatives according to the present invention may containing two or more reactive groups which allows crosslinking. Another object is that one fiber reactive group is used for fiber bonding and the other is used for attachment of other polymers containing nucleophiles.

Modified polymers or substrates may be used, e.g.:
to improve adhesion to surfaces,
to solubilize the polymer/oligomer in the corresponding matrix,
to render the polymer hydrophilic or hydrophobic,
to improve wettability and compatibility with the surrounding medium,
to increase stability to coagulation,
to modify rheology,
to improve film formation,
to complex active compounds, such as biocides, insecticides, acaricides, fungicides, herbicides, pheromones, fragrances, flavorings, pharmaceutical active compounds, cosmetic active compounds, active compounds for antistatic finishing or flame retardant finishing, UV-stabilizers, dyestuffs or a mixture thereof in the cyclodextrin cavity and release the active compounds in a controlled manner,
to increase the bioavailability of active compounds,
to stabilize active compounds, e.g. to light, temperature, oxidation, hydrolysis, evaporation by complex formation,
to solubilize active compounds,
to extract active compounds from gaseous or liquid media,
as a filter system, i.e. to absorb undesired substances from gaseous or liquid media,
as a collector system, i.e. to absorb desired substances from gaseous or liquid media,
as selective separating media in chromatography,
decrease toxicity or irritation of active compounds by complex formation,
to absorb, complex or encapsulate substances causing unpleasant or toxic odors, e.g. degradation products, by-products of polymers etc., such as perspiration products, acetic acid, butyric acid, amines, sulfur compounds or residual monomers of toxic substances,
as formulation aid for active ingredients, e.g. as a powdered formulation,
to deliver or retard the delivery of actives by complexation, e.g. fragrances.

Preferred as the substrates are textile fiber materials containing hydroxyl groups or containing nitrogen or paper, in particular textile fiber materials. Textile fiber materials can be in the form of fiber, yarn or piece goods, such as non-wovens, knitted and woven goods, pile fabrics or terry goods. Examples are silk, wool, polyamide fibers and polyurethanes, and in particular all types of cellulosic fiber materials. Such cellulosic fiber materials are, for example, the natural cellulosic fibers, such as cotton, linen and hemp, as well as cellulose and regenerated cellulose. The reactive polysaccharide derivatives according to the invention are also suitable for finishing fibers containing hydroxyl groups which are contained in blend fabrics, for example mixtures of cotton with polyester fibers or polyamide fibers. The reactive polysaccharide derivatives according to the invention are particularly suitable for finishing cellulosic materials. They can furthermore be used for finishing natural or synthetic polyamide fiber materials.

The reactive polysaccharide derivatives of formulae (1) are applied to the textile goods in aqueous solution, in analogy to the dyeing processes known for reactive dyes or finishing processes in textile industry. They are suitable both for the exhaust- and for the pad-method, in which the goods are impregnated with aqueous solutions, which may contain salts. Dyeing machines customary in dyeing with reactive dyes are preferably utilized for this. The reactive polysaccharides are fixed, if appropriate after an alkali treatment, or preferably in the presence of alkali, under the action of heat, steam or by storage at room temperature for several hours, thereby forming a chemical bond with the substrate. The reactive polysaccharide derivatives according to the invention can also be applied in the presence of crosslinking agents or resin finish, for example, dimethylol-urea, dimethoxy-methyl-urea, trimethoxy-methyl-melamin, tetramethoxy-methyl-melamine, hexamethoxy-methyl-melamine, dimethylol-dihydroxy-ethylene-urea, dimethylol-propylene-urea, dimethylol-4-methoxy-5,5'-dimethyl-propylene-urea, dimethylol-5-hydroxypropylene-urea, butane-tetra-carboxylic-acid, citric acid, maleic acid, bonding agents, for example, acrylates, silicones, urethanes, butadienes, in a textile finishing process which may result in superior effect durability. Such textile finishing processes are described, for example, in DE-A-40 35 378. After the fixing, the finished substrates are rinsed thoroughly with cold and hot water, if appropriate with the addition of an agent, which has a dispersing action and promotes diffusion of the non-fixed portions.

The finished substrates contain, for example, 0.1 to 25% by weight, preferably 0.5 to 10% by weight, and most preferably 1 to 3% by weight, of the reactive polysaccharide derivative according to the present invention, based on the total weight of the substrate.

The finished substrates can be used to complex or encapsulate, for example, UV-stabilizers, antimicrobials, biocides, bactericides, acaricides, insecticides, fungicides, pharmaceutical active compounds, fragrances, perfumes, pheromones, vitamines or skin-, hair and textile benefit agents, e.g. UV-absorber, fatty acids, anti-irritants or inflammatory agents, to e.g. solubilize water-insoluble or poorly water-soluble substances, to increase the bioavailability of active compounds; to stabilize substances against light, temperature, oxidation, hydrolysis or from volatility, to mask bad taste or unpleasant odor, to slowly release active compounds in a controlled manner over a prolonged period of time (delivery systems). On the other side, the finished substrates are useful to assimilate chemical substances, e.g. from a gaseous or liquid environment, which are captured, e.g. in the cyclodextrin cavity, thereby serving as a collector system. Such collector systems may find application in the field of medical diagnostics, help to determine pollutants from the environment or depollute or decontaminate gaseous of liquid media. Decomposition products of sweat are trapped in the cyclodextrin cavity, thus diminishing or preventing malodor. Textile materials, such as clothings finished with the inventive composition stay fresh with a pleasant smell. Laundering ensures removal of the decomposition products of sweat from the cyclodextrin cavity and regeneration of the system. At the same time perfume present in detergents/fabric softeners is retained for longer on the finished textile for prolonged freshness.

The Examples given hereinbelow are intended to illustrate the invention without limiting it to the Examples specifically mentioned.

EXAMPLE 1

(a) 480 g of water, 90.8 g (0.08 mole) of Cavamax® W7 (β-cyclodextrin purchased from Wacker), 10.8 g of a potassium hydroxide solution (1N) and 0.2 g of benzyl dimethyl hexadecyl ammoniumchloride are placed in a 750 ml flask. The suspension obtained is heated to 50° C. and 19.1 g (0.10 mol) of 4-vinylsulfonyl aniline are added in portions over 10 minutes. The reaction mixture turns clear after the addition is finished. The solution is stirred at 50° C. for 4 hours. Then, the solution is cooled and 10.8 g of hydrochloric acid (1N) are added. Stirring is continued for 15 minutes at room temperature. Subsequently, the solution is filtered and concentrated. The product is isolated by precipitation in acetone. The precipitate is separated by filtration, slurried in ethanol, filtered and dried. 89.1 g of a product are obtained. HPLC and elemental analysis reveal that the product essentially comprises a compound which corresponds to the formula

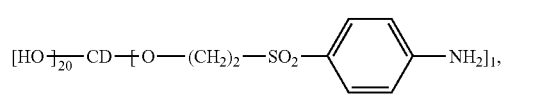

(101)

wherein
CD is the backbone of the β-cyclodextrin molecule apart from the hydroxyl groups.

(b) 3.52 g (0.019 mole) of cyanuric chloride, 25 g of cold water, 20 g of crushed ice and 1 drop of Irgapadol® FFU (wetting agent available from Ciba Specialty Chemicals) are placed in a 350 ml flask and stirred vigorously for 30 minutes at 0 to 2° C. Subsequently, a filtered solution containing 5.6 g (0.019 mole) of 4-(β-sulfatoethylsulfonyl)aniline in 10 g of water (pH 4.5) is added dropwise at 0 to 5° C. within 20 minutes. During the addition the pH is kept at 4.0 by addition of a sodium hydroxide solution (1N). Reaction is continued at 0 to 5° C. for 4 hours at pH 4. Then, a solution of 24.5 g (0.019 mole) of the product obtained according to step (a) in 40 g of water is added and the reaction mixture is slowly heated to 40° C. The pH is kept at 5.0 by addition of a sodium hydroxide solution (1N). Reaction is continued at 40° C. for 5 hours at pH 5.0. The solution obtained is filtered which yields 161 g of a clear colorless filtrate. It contains 20% of a product essentially comprising a compound which corresponds to the formula

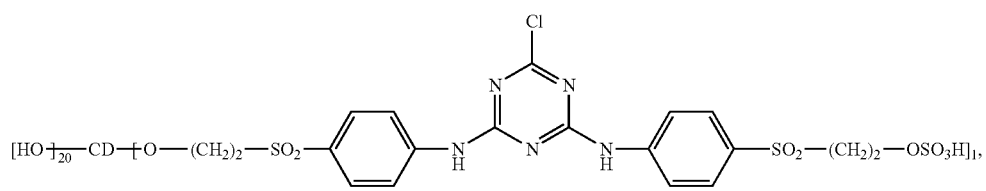

(102)

wherein
CD is the backbone of the β-cyclodextrin molecule apart from the hydroxyl groups.

EXAMPLES 2 TO 17

Valuable reactive cyclodextrin derivatives which essentially comprise a compound of the following general formula

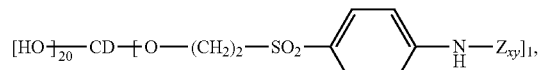

wherein $Z_{xy}$ is the radical listed in the 2$^{nd}$ column of Table 1 and CD is the backbone of the β-cyclodextrin molecule apart from the hydroxyl groups, can likewise be prepared in a manner analogous to that described in Example 1, if 4-(β-sulfatoethylsulfonyl)aniline is replaced by an equimolar amount of one of the amines given in the 3$^{rd}$ column of Table 1.

TABLE 1

| Ex. | $Z_{xy}$ | Amine |
|---|---|---|
| 2 | 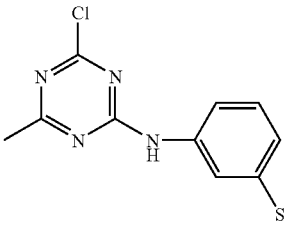 | 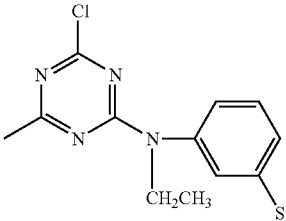 |
| 3 | | |
| 4 | | |
| 5 | | |
| 6 | | |

TABLE 1-continued

| Ex. | $Z_{xy}$ | Amine |
|---|---|---|
| 7 | $Z_{16}$ = 4-chloro-6-methyl-1,3,5-triazin-2-yl-amino attached to 2-position of naphthalene-1-sulfonic acid, with 6-$SO_2$—$(CH_2)_2$—$OSO_3H$ | 2-amino-naphthalene-1-sulfonic acid with 6-$SO_2$—$(CH_2)_2$—$OSO_3H$ |
| 8 | $Z_{17}$ = 4-chloro-6-methyl-1,3,5-triazin-2-yl-amino attached to 2-position of naphthalene-1-sulfonic acid | 2-amino-naphthalene-1-sulfonic acid |
| 9 | $Z_{18}$ = 4-chloro-6-methyl-1,3,5-triazin-2-yl-amino attached to 4-position of benzamide with $-CO-NH-(CH_2)_2-SO_2-(CH_2)_2-OSO_3H$ | 4-amino-benzamide with $-CO-NH-(CH_2)_2-SO_2-(CH_2)_2-OSO_3H$ |
| 10 | $Z_{19}$ = 4-chloro-6-methyl-1,3,5-triazin-2-yl-amino attached to 4-position of benzamide with $-CO-NH-(CH_2)_3-SO_2-(CH_2)_2-OSO_3H$ | 4-amino-benzamide with $-CO-NH-(CH_2)_3-SO_2-(CH_2)_2-OSO_3H$ |
| 11 | $Z_{20}$ = 4-chloro-6-methyl-1,3,5-triazin-2-yl-amino attached to 3-position of benzamide with $-CO-NH-(CH_2)_2-SO_2-(CH_2)_2-OSO_3H$ | 3-amino-benzamide with $-CO-NH-(CH_2)_3-SO_2-(CH_2)_2-OSO_3H$ |
| 12 | $Z_{21}$ = 4-chloro-6-methyl-1,3,5-triazin-2-yl-amino attached to 2-$SO_3H$, 4-$SO_2$—$(CH_2)_2$—$OSO_3H$ substituted aniline | 2-$SO_3H$, 4-$SO_2$—$(CH_2)_2$—$OSO_3H$ substituted aniline |
| 13 | $Z_{22}$ = 4-chloro-6-methyl-1,3,5-triazin-2-yl-amino attached to 2-$SO_3H$, 4-(NHCO—CHBr—$CH_2Br$) substituted aniline | 2-$SO_3H$, 4-(NHCO—CHBr—$CH_2Br$) substituted aniline |

TABLE 1-continued

| Ex. | $Z_{xy}$ | Amine |
|---|---|---|
| 14 | $Z_{23}$ = [chlorotriazine with NH-phenyl-SO₃H] | H₂N—⟨phenyl⟩—SO₃H |
| 15 | $Z_{24}$ = [chlorotriazine with NH—(CH₂)₂—SO₂—(CH₂)₂—Cl] | H₂N—(CH₂)₂—SO₂—(CH₂)₂—Cl |
| 16 | $Z_{25}$ = [chlorotriazine with NH—(CH₂)₂—O—(CH₂)₂—SO₂—(CH₂)₂—Cl] | H₂N—(CH₂)₂—O—(CH₂)₂—SO₂—(CH₂)₂—Cl |
| 17 | $Z_{26}$ = [chlorotriazine with NH—(CH₂)₂—OH] | H₂N—(CH₂)₂—OH |

APPLICATION EXAMPLES 100 g/l of the cyclodextrin derivative obtained according to example 1 are applied to a cotton tricot fabric by the pad-batch method and fixed. Liquor pick-up is 98-102%. Another cotton tricot is impregnated with a liquor containing 2% by weight of the cyclodextrin derivative obtained according to example 1 by the exhaust method. The application conditions and the degrees of fixation are given in Table 2 below.

TABLE 2

| Application method | Conditions | Degree of fixation |
|---|---|---|
| Pad-batch | 60° C., 20 g/l Na₂CO₃, 4 hours | ca. 40% |
| Pad-batch | 80° C., 20 g/l Na₂CO₃, 4 hours | ca. 20% |
| Pad-thermofix | 180° C., 10 g/l Na₂CO₃, 1 min. | ca. 50% |
| Exhaust | 60° C., 10 g/l Na₂CO₃, 1 hours | ca. 30-35% |

Covalently bound cyclodextrin derivative is verified by determination of the weight increase of the finished fabric and by discoloration of a basic purple phenolphthaleine solution (Wang, Chao-Xia, Chen Shui-Lin, Coloration Technology, 2004, 12, pages 14-18).

After determination of the initial degree of fixation, the fabrics are submitted to a washing test at 40° C. (1 time, 5 times, 10 times, 20 times and 50 times) under the following conditions:

| | |
|---|---|
| Detergent: | 30 g ECE Coulour Fastness Test Detergent 77 |
| Washing machine: | Wascator FOM 71 MP LAB |
| Washing time: | 10 minutes |
| Rinsing: | 2x for 1 minute with each 20 l of water |

The washing resistance of the finished fabrics obtained according to the pad-batch and exhaust-method is good. The content of the cyclodextrine derivative fixed to the fabric is reduced by less than 20% after 20 washing cycles.

The invention claimed is:
1. A reactive polysaccharide derivative of formula

$$[Z_1—B—SO_2—CH_2—CH_2—O]_n PS[OH]_m \quad (1),$$

wherein
B is a radical of formula

(2a)

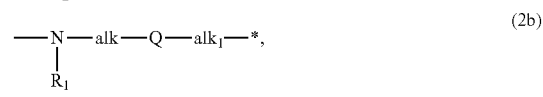

(2b)

(2c)

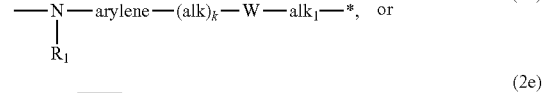

(2d)

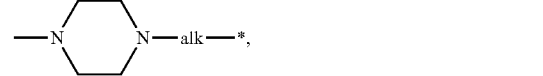

(2e)

wherein
$R_1$ is hydrogen or $C_1$-$C_4$alkyl,
$R_2$ is hydrogen, $C_1$-$C_4$alkyl unsubstituted or substituted by hydroxy, sulfo, sulfato, carboxy or by cyano, or a radical

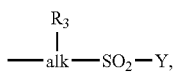

$R_3$ is hydrogen, hydroxy, sulfo, sulfato, carboxy, cyano, halogen, $C_1$-$C_4$alkoxycarbonyl, $C_1$-$C_4$alkanoyloxy, carbamoyl or a group —$SO_2$—Y, alk and $alk_1$ are each independently of the other linear or branched $C_1$-$C_6$alkylene, arylene is a phenylene or naphthylene radical unsubstituted or substituted by sulfo, carboxy, $C_1$-$C_4$alkyl, $C_1$-$C_4$alkoxy or by halogen, Q is a radical —O— or —$NR_1$— wherein $R_1$ is as defined above, W is a group —$SO_2$—$NR_2$—, —$CONR_2$— or —$NR_2CO$— wherein $R_2$ is as defined above, Y is vinyl or a radical —$CH_2$—$CH_2$—U and U is —Cl, —Br, —F, —$OSO_3H$, —OCO—$CH_3$, $OPO_3H_2$, OCO—$C_6H_5$, $OSO_2$—$C_1$-$C_4$alkyl and $OSO_2$—N($C_1$-$C_4$alkyl)$_2$, and k is a number 0 or 1, $Z_1$ is a reactive radical which radical reacts with a natural or man-made polymer or a textile fiber material, PS corresponds to the backbone of the polysaccharide molecule apart from the hydroxyl groups and which polysaccharide molecule is a cyclodextrin or a cyclodextrin derivative, which cyclodextrin derivative is a cyclodextrin ether or mixed ether, cyclodextrin ester or mixed ester or mixed cyclodextrin/ether/ester derivative, m is 0, 1 or an integer greater than 1, n is 1 or an integer greater than 1, and the sum of n+m corresponds to the original number of hydroxyl groups in the polysaccharide molecule, and wherein the asterisk in each of the radicals B of formulae (2a), (2b), (2c), (2d) and (2e) indicates the position which is bound to the sulfonyl group of the polysaccharide derivative of formula (1).

2. A reactive polysaccharide derivative according to claim 1, wherein B is a radical of formula

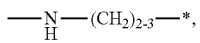 (2a′)

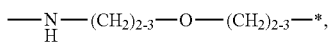 (2b′)

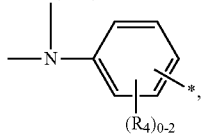 (2c′)

 (2d′)

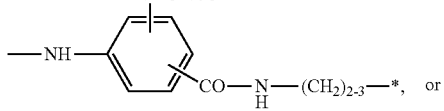 (2d″)

wherein ($R_4$)$_{0-2}$ is 0 to 2 identical or different substituents from the group of methyl, methoxy and sulfo, and the asterisk in each of the radicals B of formulae (2a′), (2b′), (2c′), (2d′) and (2d″) indicates the position which is bound to the sulfonyl group of the polysaccharide derivative of formula (1).

3. A reactive polysaccharide derivative according to claim 1, wherein $Z_1$ is a radical of formula

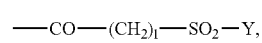 (3a)

 (3b)

 (3c)

 (3d)

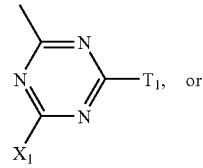

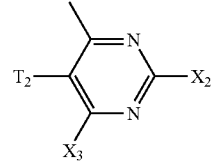 (3e)

wherein

Hal is chlorine or bromine, $X_1$ is halogen, pyridinium, 3-carboxypyridin-1-yl or 3-carbamoylpyridin-1-yl, or a reactive radical of formula

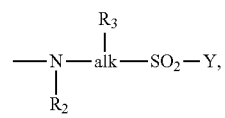 (4a)

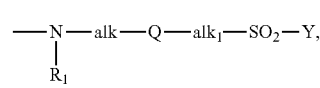 (4b)

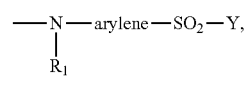 (4c)

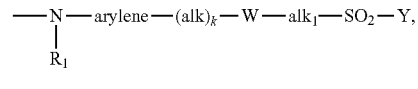 (4d)

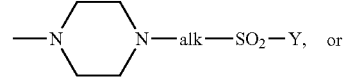 (4e)

-continued

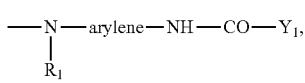 (4f)

wherein
R₁ is hydrogen or $C_1$-$C_4$alkyl,
R₂ is hydrogen, $C_1$-$C_4$alkyl unsubstituted or substituted by hydroxy, sulfo, sulfato, carboxy or by cyano, or a radical

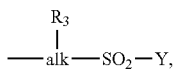

R₃ is hydrogen, hydroxy, sulfo, sulfato, carboxy, cyano, halogen, $C_1$-$C_4$alkoxycarbonyl,
$C_1$-$C_4$alkanoyloxy, carbamoyl or a group —$SO_2$—Y,
alk and $alk_1$ are each independently of the other linear or branched $C_1$-$C_6$alkylene,
arylene is a phenylene or naphthylene radical unsubstituted or substituted by sulfo, carboxy, $C_1$-$C_4$alkyl, $C_1$-$C_4$alkoxy or by halogen,
Q is a radical —O— or —NR₁— wherein R₁ is as defined above,
W is a group —$SO_2$—NR₂—, —$CONR_2$— or —NR₂CO— wherein R₂ is as defined above,
Y is vinyl or a radical —CH₂—CH₂—U and U is defined as in claim 1,
Y₁ is a group —CH(Hal)-CH₂-Hal or —C(Hal)=CH₂ and Hal is chlorine or bromine, and
l is an integer from 1 to 6 and k is a number 0 or 1, and
X₂ is halogen or $C_1$-$C_4$alkylsulfonyl,
X₃ is halogen or $C_1$-$C_4$alkyl,
T₁ has independently the same definitions as X₁ above, or is
hydroxy;
$C_1$-$C_4$alkoxy unsubstituted or substituted in the alkyl moiety by
$C_1$-$C_4$alkoxy, hydroxy, sulfo or by carboxy;
$C_1$-$C_4$alkylthio unsubstituted or substituted in the alkyl moiety by $C_1$-$C_4$alkoxy, hydroxy, sulfo or by carboxy;
amino;
N-mono- or N,N-di-$C_1$-$C_6$alkylamino unsubstituted or substituted in the alkyl moiety by $C_2$-$C_4$-alkanoylamino, $C_1$-$C_4$alkoxy, hydroxy, sulfo, sulfato, carboxy, cyano, carbamoyl or by sulfamoyl and uninterrupted or interrupted in the alkyl moiety by oxygen;
$C_5$-$C_7$cycloalkylamino which includes both the unsubstituted radicals and the radicals substituted in the cycloalkyl ring by $C_1$-$C_4$alkyl or by carboxyl;
phenylamino or N—$C_1$-$C_4$alkyl-N-phenylamino which includes both the unsubstituted radicals and the radicals substituted in the phenyl ring $C_1$-$C_4$alkyl, $C_1$-$C_4$alkoxy, $C_2$-$C_4$alkanoylamino, carboxy, carbamoyl, sulfo or by halogen;
naphthylamino unsubstituted or substituted in the naphthyl ring by sulfo;
benzylamino unsubstituted or substituted in the phenyl moiety by $C_1$-$C_4$alkyl, $C_1$-$C_4$alkoxy, carboxy, sulfo or by halogen; or
piperidino or morpholino
and
T₂ is hydrogen, cyano or halogen.

4. A reactive polysaccharide derivative according to claim 1, wherein Z₁ is a radical of formula —CO—(CH₂)ₗ—$SO_2$—Y, (3a)

—CO—CH(Hal)—CH₂—Hal, (3b)

—CO—C(Hal)=CH₂, or (3c)

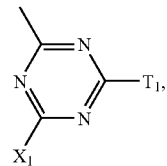 (3d)

wherein
Y is vinyl, beta-chloroethyl or beta-sulfatoethyl,
Hal is bromine, l is a number 2 or 3,
X₁ is halogen,
T₁ is $C_1$-$C_4$alkoxy, $C_1$-$C_4$alkylthio, hydroxy, amino, N-mono- or N,N-di-$C_1$-$C_4$alkylamino unsubstituted or substituted in the alkyl moiety by hydroxy, sulfato or by sulfo, morpholino, or phenylamino or N—$C_1$-$C_4$alkyl-N-phenylamino each unsubstituted or substituted in the phenyl ring by sulfo, carboxy, acetylamino, chlorine, methyl or by methoxy and wherein the alkyl is unsubstituted or substituted by hydroxy, sulfo or by sulfato, or naphthylamino unsubstituted or substituted by from 1 to 3 sulfo groups, or is a fibre-reactive radical of formula —NH—(CH₂)₂₋₃—$SO_2$Y, (4a')

—NH—(CH₂)₂₋₃—O—(CH₂)₂₋₃—$SO_2$Y, (4b')

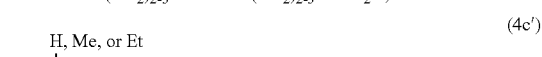 (4c')

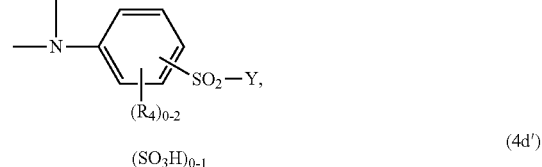 (4d')

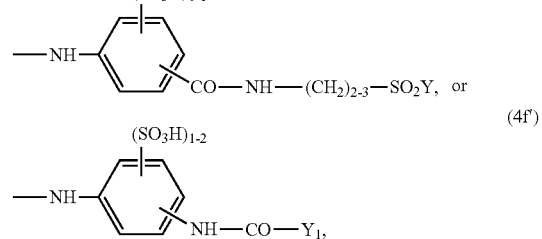 (4f')

wherein
(R₄)₀₋₂ is 0 to 2 identical or different substituents from the group of methyl, methoxy and sulfo,
Y is as defined above, and
Y₁ is a group —CH(Br)—CH₂—Br or —C(Br)=CH₂.

5. A process for the preparation of a reactive polysaccharide derivative of formula (1) according to claim 1, which process comprises the steps of
(i) reacting the polysaccharide compound of formula

PS—[OH]ₙ₊ₘ (5)

with at least n molar equivalents of the compound of the formula

H—B—$SO_2$—Y (6)

to yield the compound of formula $$[H-B-SO_2-CH_2-CH_2-O]_n\text{PS-[OH]}_m \quad (7),$$

and allowing the compound of the formula (7) to react with at least n molar equivalents of the compound of the formula $$Z_1-X \quad (8), \text{ or}$$

(ii) reacting the polysaccharide compound of formula (5) with at least n molar equivalents of the compound of the formula $$Z_1-B-SO_2-Y \quad (9),$$

wherein

PS, B, Y, $Z_1$, m and n are as defined in claim 1, and X is a leaving group.

6. A process for the preparation of compounds or substrates modified with polysaccharides comprising reacting said compounds or substrates with a polysaccharide derivative according to claim 1.

7. A process according to claim 6, wherein textile fiber materials containing hydroxyl groups or containing nitrogen are treated with the polysaccharide derivative according to claim 1.

8. A process according to claim 7, wherein the textile fiber materials are cellulose containing fiber materials.

9. A polysaccharide derivative of formula $$[H-B-SO_2-CH_2-CH_2-O]_n\text{PS-[OH]}_m \quad (7),$$

wherein
B is a radical of the formula

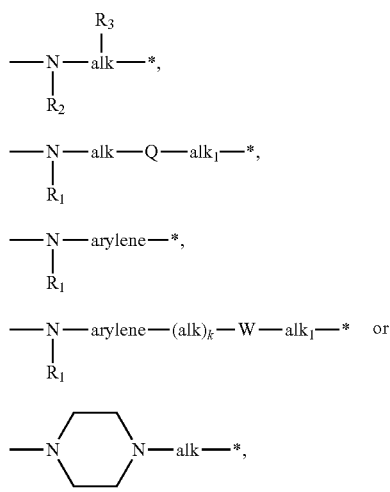

wherein
$R_1$ is hydrogen or $C_1$-$C_4$alkyl,
$R_2$ is hydrogen, $C_1$-$C_4$alkyl unsubstituted or substituted by hydroxy, sulfo, sulfato, carboxy or by cyano, or a radical

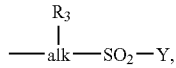

$R_3$ is hydrogen, hydroxy, sulfo, sulfato, carboxy, cyano, halogen, $C_1$-$C_4$alkoxycarbonyl, $C_1$-$C_4$alkanoyloxy, carbamoyl or a group $-SO_2-Y$,
alk and $alk_1$ are each independently of the other linear or branched $C_1$-$C_6$alkylene,
arylene is a phenylene or naphthylene radical unsubstituted or substituted by sulfo, carboxy, $C_1$-$C_4$alkyl, $C_1$-$C_4$alkoxy or by halogen,
Q is a radical $-O-$ or $-NR_1-$ wherein $R_1$ is as defined above,
W is a group $-SO_2-NR_2-$, $-CONR_2-$ or $-NR_2CO-$ wherein $R_2$ is as defined above,
Y is vinyl or a radical $-CH_2-CH_2-U$ and U is $-Cl$, $-Br$, $-F$, $-OSO_3H$, $-OCO-CH_3$, $OPO_3H_2$, $-OCO-C_6H_5$, $OSO_2-C_1$-$C_4$alkyl and $OSO_2-N(C_1$-$C_4$alkyl)$_2$, and
k is a number 0 or 1,
PS corresponds to the backbone of the polysaccharide molecule apart from the hydroxyl groups, and which polysaccharide molecule is a cyclodextrin or a cyclodextrin derivative, which cyclodextrin derivative is a cyclodextrin ether or mixed ether, cyclodextrin ester or mixed ester or mixed cyclodextrin/ether/ester derivative,
m is 0, 1 or an integer greater than 1,
n is 1 or an integer greater than 1, and
the sum of n+m corresponds to the original number of hydroxyl groups in the polysaccharide molecule, and wherein
the asterisk in each of the radicals B of formulae (2a), (2b), (2c), (2d) and (2e) indicates the position which is bound to the sulfonyl group of the polysaccharide derivative of formula (1).

10. A formulation containing a reactive polysaccharide derivative as defined in claim 1.

11. A process according to claim 7, wherein the textile fiber materials containing hydroxyl groups or containing nitrogen are treated with the polysaccharide derivative before, during or after the dyeing of the textile fiber material.

12. A process according to claim 11, wherein the textile fiber materials containing hydroxyl groups or containing nitrogen are treated with the polysaccharide derivative in the pretreatment, dyeing and finishing step.

* * * * *